United States Patent [19]

Kinnard

[11] 3,925,717

[45] Dec. 9, 1975

[54] INDUCTIVE BASE DRIVE FOR TRANSISTOR SWITCHING IN DC CONVERTERS

[75] Inventor: J. Rothe Kinnard, Austin, Tex.

[73] Assignee: International Business Machines Corporation, Armonk, N.Y.

[22] Filed: Oct. 3, 1974

[21] Appl. No.: 511,840

[52] U.S. Cl. .................... 321/2; 321/44; 331/112
[51] Int. Cl.² ..................................... H02M 3/335
[58] Field of Search .................... 321/2, 44, 45 ER; 323/DIG. 1; 331/112, 148, 149

[56] References Cited
UNITED STATES PATENTS

| | | | |
|---|---|---|---|
| 3,023,375 | 2/1962 | Sheridan et al. | 331/112 |
| 3,200,261 | 8/1965 | Fishman et al. | 331/112 |
| 3,501,752 | 3/1970 | Thornwall | 331/112 |
| 3,628,047 | 12/1971 | Cronin | 323/DIG. 1 |
| 3,846,691 | 11/1974 | Higgins | 321/45 ER |
| 3,855,518 | 12/1974 | Genuit | 321/2 |

*Primary Examiner*—William M. Shoop
*Attorney, Agent, or Firm*—Douglas H. Lefeve

[57] ABSTRACT

A DC voltage converter utilizing a switching transistor for switching the primary of a transformer, the transistor including an inductive base drive circuit. The transistor is initially turned on by a relatively small current from a high resistance connected between the DC voltage source and the base of the transistor. As current in the transformer primary increases, requiring increasing base current to sustain transistor conduction, another current derived from a secondary winding of the transformer is applied through an inductor to the base of the transistor. When the transistor is turned off by connection of the transistor emitter and base terminals the energy stored in the inductor and in the transformer is transferred to another secondary winding of the transformer that is connected to the load.

8 Claims, 4 Drawing Figures

INDUCTIVE BASE DRIVE FOR TRANSISTOR SWITCHING IN DC CONVERTERS

BACKGROUND OF THE INVENTION

1. Field of the Invention

This invention relates to DC voltage converters having transistor switching elements controlled by a current derived from the DC input to the converter.

2. Description of the Prior Art

Many circuits are known in the prior art for converting a first DC voltage of one magnitude to another voltage of a different magnitude. A transformer is included in many of these prior art circuits having a primary connected to the DC voltage source through a series semiconductor switching device such as a transistor. Application of a current to the control element, or base, of the transistor allows energization of the primary winding of the transformer by the DC voltage source. A voltage is then presented across a secondary winding of the transformer that may be connected to the load, in some instances through a rectification and filtering network. Turning the transistor off by removal or reversal of the base current allows energy stored in the transformer core to be transferred through the secondary winding to the load.

Voltage regulation systems have been proposed in which the secondary or output voltage of the transformer is sampled, and a control signal is derived from this sampling to vary the frequency or time during which the switching element connecting the transformer primary to the DC voltage source is turned on. Because of the relatively high base current that may be needed to sustain conduction of the switching transistor, however, base drive to the switching transistor must usually be derived from a source other than this control signal.

In one prior art DC converter circuit, a resistance is connected between the DC voltage source and the base of the switching transistor to develop a relatively small current into the base of the switching transistor to begin conduction. As current in the transformer primary winding and through the collector of the switching transistor increases, additional current is needed to maintain the switching transistor in a conducting state. This additional current is provided by a secondary winding on the transformer having one terminal connected to the emitter of the switching transistor and another terminal connected through a second series resistance to the base of the transistor. For a fixed DC supply voltage, however, this solution results in a substantially high, fixed current through the second resistor during all but the very beginning of the time period during which the switching transistor is conducting. Further, when the number of turns in this secondary winding and the resistance value must be chosen to provide sufficient current to the base of the switching transistor for conduction throughout a wide variation of DC supply voltages, the amount of power dissipated by this second resistance becomes very substantial, thereby seriously reducing the efficiency of the circuit.

In another prior art circuit, rather than providing a separate secondary winding on the converter transformer for deriving the additional base drive current, a winding of a current transformer is inserted in series with the converter transformer primary and switching transistor collector. As primary winding current and collector current of both transformers increase, a second winding of this current transformer provides a corresponding increase in base dirve current to the switching transistor. Using this approach the turns ratio and inductive properties of the current transformer can be designed to allow the base to be driven for transistor conduction at various collector currents, but not overdriven. As collector current increases, the base drive current increases in accordance with the turns ratio of the current transformer. Thus, the base is not driven by a fixed, substantially high, worst case current, as in the resistive drive circuit described above. However, the energy stored in the current transformer during the time that the switching transistor is conducting must be dissipated while the transistor is turned off, and the loss of this energy, therefore, decreases the efficiency of this circuit.

It would, therefore, be desirable to achieve high efficiency in a DC converter by eliminating the loss or dissipation of energy in providing base drive current required for conduction of a switching transistor.

SUMMARY OF THE INVENTION

Accordingly, a DC voltage converter is provided including an inductive base drive circuit connected to the base of a switching transistor that is utilized to alternately connect and disconnect a primary winding of a transformer and the DC voltage source. The transformer includes first and second secondary windings, the first secondary winding being connected to the load and the second secondary winding having one terminal connected for reference to the DC supply voltage. An inductor is connected beteween a second terminal of the second secondary winding and the base of the switching transistor. A relatively high resistance is connected between the DC voltage source and the base of the switching transistor.

When the DC voltage source is energized, a relatively small current flows through the high resistance into the base of the transistor to render the transistor conductive. Conduction of the transistor allows application of the DC supply voltage to the transformer primary, thereby providing secondary voltages at the secondary windings of the transformer. A current flows through the inductor and second secondary winding of the transformer into the base of the transistor. As current in the transformer primary increases, requiring increasing base current to sustain transistor conduction, this current provided by the second secondary winding and inductor increases accordingly. The number of turns in the secondary winding and inductor size are chosen in accordance with the gain of the switching transistor so that the base current supplied to the transistor is sufficient to sustain conduction of the transistor at any collector current, but varies in proportion to the collector current so that the transistor is not oversaturated at any collector current.

When the transistor is turned off by connection of the transistor emitter and base terminals, the energy stored in the second secondary winding and inductor is transferred through the transformer core to the first secondary winding of the transformer, thereby allowing the energy stored in the base drive circuit during transistor conduction to be transferred to the load rather than being dissipated. High converter efficiency is attained by the fact that the inductive base drive circuit dissipates substantially no energy during either conduction or non-conduction of the switching transistor.

The foregoing and other objects, features, and advantages of the invention will be apparent from the following more particular description of a preferred embodiment of the invention as illustrated in the accompanying drawing.

DETAILED DESCRIPTION OF THE PREFERRED EMBODIMENT

Figure 1:
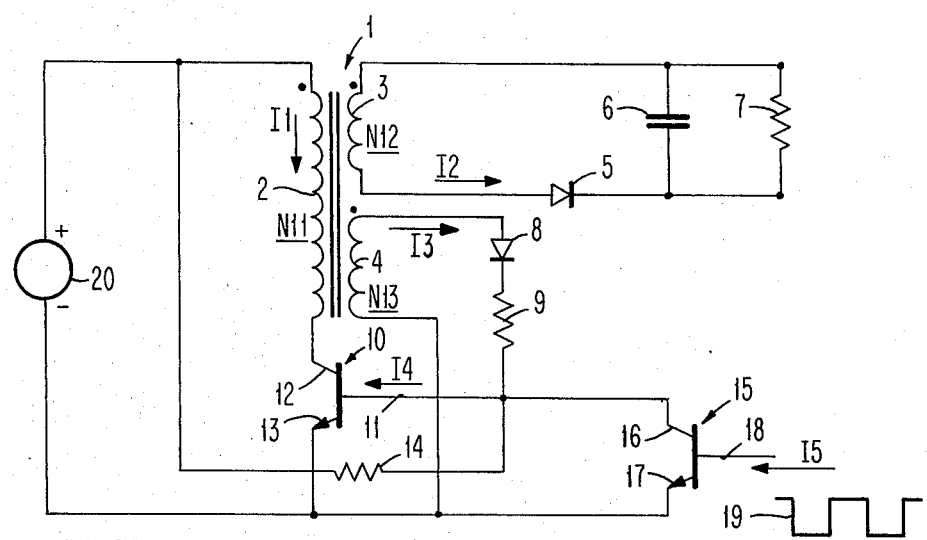
FIGS. 1 and 2 are schematic diagrams of DC converters using prior art circuitry for providing base drive for the switching transistor.

Referring now to FIG. 1, a prior art DC converter circuit is shown that converts DC voltage of a first magnitude supplied by voltage source 20 to a DC voltage of a second magnitude supplied to load 7. The positive terminal of voltage source 20 is connected to one terminal of a primary winding 2 of power transformer 1 while the negative, reference terminal of voltage source 20 is connected to the emitter 13 of switching transistor 10 and to the emitter 17 of control transistor 15. The other end of primary winding 2 is connected to the collector 12 of switching transistor 10 so that winding 2 is connected across voltage source 20 for energization during conduction of switching transistor 10. A high resistance 14 is connected between the positive terminals of DC supply 20 and the base 11 of switching transistor 10 to provide a substantially small current flow into the base of transistor 10 to render transistor 10 conductive for very low collector currents during the time that transistor 15 is rendered non-conductive by a down level of the current I5 of waveform 19 applied to base 18 of transistor 15. This initial conduction of transistor 10 allows the flow of current I1 through primary winding 2 and collector 12 of transistor 10 which, in turn, induces a voltage of magnitude N12/N11 times the DC voltage of source 20 in the secondary winding 3 of transformer 1. However, because of the winding configuration noted in FIG. 1, diode 5 is back biased at this time and load 7 receives no power.

Energization of winding 2 also induces a voltage of magnitude N13/N11 times the DC voltage of source 20 in winding 4 of transformer 1. One end of winding 4 is connected to the negative, or reference, terminal of source 20 while the other terminal of winding 4 is connected through diode 8 and resistor 9 to the base terminal 11 of transistor 10. During this initial conduction of transistor 10 the voltage induced across winding 4 forward biases diode 8 to allow current I3 to flow through diode 8 and resistor 9 into base 11 to provide further base current to sustain conduction of switching transistor 10. As current I1 increases, a greater amount of base current is needed to maintain transistor 10 in a conducting state. Current I4 flowing into base 11 is the sum of the currents flowing through resistors 14 and 9. Since the current in resistor 14 is fixed at a very small level, the current in resistor 9 must be substantial for high values of I1 flowing into collector 12 of transistor 10. Further, if the DC voltage from source 20 varies appreciably, resistor 9 must be chosen to provide the highest necessary base current into transistor 10 under worst case conditions. Therefore, the $I^2R$ losses introduced by the dissipative nature of resistor 9 become substantial. Further, because the base current provided to transistor 10 by the combination of winding 4, diode 8, and resistor 9 is of a relatively high, constant magnitude to sustain conduction of transistor 10 under the highest magnitudes of current I1, difficulties and time delays encountered in switching transistor 10 to a non-conducting state may be appreciable at times when current I1 is substantially less than its maximum magnitude.

Transistor 10 is switched off by an up level of current I5 applied to base 18 of control transistor 15. This provides a low impedance path between collector 16 and emitter 17 of transistor 15 and a low impedance path between base 11 and emitter 13 of transistor 10. When transistor 10 is switched off the polarity of voltages reverses in the transformer windings and diode 8 becomes back biased to prevent any further dissipation in resistor 9. Diode 5 becomes forward biased to supply current I2 to load 7 and to charge filter capacitor 6. It will, therefore, be understood that the major disadvantages in the base drive circuit of FIG. 1 are the dissipation in resistor R9 that can lead to substantial inefficiency of the DC converter as a whole and the often excessive base drive currents applied to transistor 10.

Figure 2:
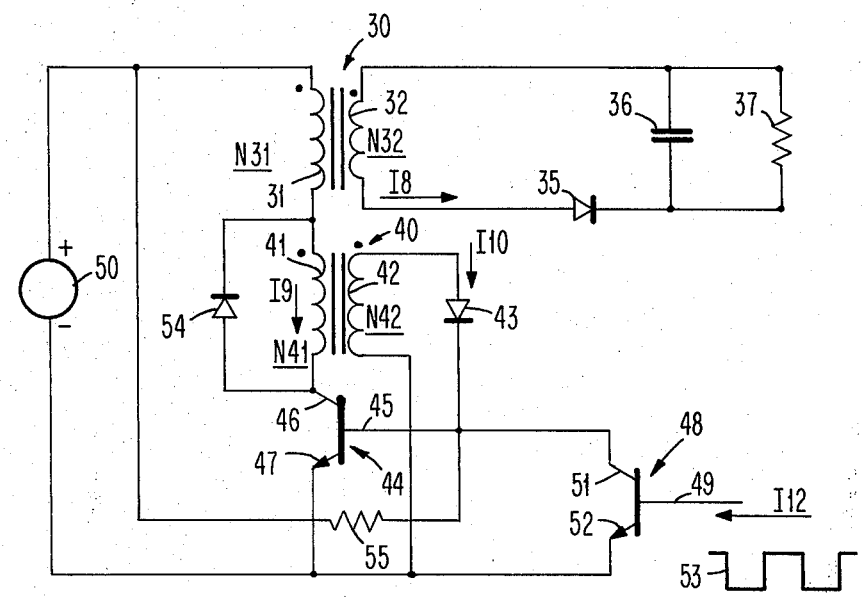

Somewhat improved efficiency is achieved in the prior art DC converter circuit of FIG. 2. In FIG. 2 the positive terminal of DC voltage source 50 is connected to one end of the primary winding 31 of transformer 30. The negative, reference terminal of source 50 is connected to the emitter 47 of switching transistor 44 and to the emitter 52 of control transistor 48. Assuming that the current I12 of waveform 53 applied to base 49 of transistor 48 is at a down level, transistor 44 is initially rendered conductive by the substantially small current flowing through a high resistance 55 connected between the positive terminal of source 50 and the base terminal 45 of transistor 44. A primary winding 41 of current transformer 40 is interposed between a second terminal of winding 31 of transformer 30 and the collector 46 of transistor 44. With transistor 44 in a conducting state, current I9 flows through windings 31 and 41 and into collector 46 in the direction indicated in FIG. 2. Diode 54 is back biased for this direction of current flow so that none of this primary current flows therethrough.

Current transformer 40 includes a secondary winding 42 having one terminal connected for reference to source 50 and a second terminal connected through diode 43 to base 45 of transistor 44. With current I9 flowing through winding 41 of current transformer 40, current I10 of a magnitude N41/N42 I9 flows through forward biased diode 43 into base 45 of transistor 44. The turns ratio N41/N42 of transformer 40 is chosen in accordance with the gain of transistor 44 so that as current I9 increases a proportional, fractional increase in current I10 takes place. Thus, transistor 44 is maintained in a conducting state and is driven by increased base current as the need arises because of increased collector current. In this manner, transistor 44 is never driven so deeply into saturation that the problems arise in the rapid turning off of transistor 44 that are described above with reference to transistor 10.

Transistor 44 is turned off by application of an up level of current I12 (waveform 53) to base 49 of control transistor 48. This provides a low impedance path between collector 51 and emitter 52 of transistor 48 which, in turn, provides a low impedance path between base 45 and emitter 47 of switching transistor 44 to render transistor 44 non-conductive. When transistor 44 is rendered non-conductive the voltage across the secondary winding 32 of transformer 30 reverses, thereby forward-biasing diode 35 to enable current I8 to flow therethrough to load 37 and filter capacitor 36. The voltage produced by winding 32 is of a magnitude N32/N31 times the voltage across winding 31 of transformer 30. Reversal of a voltage across winding 42 of transformer 40 back biases diode 43 to open the secondary circuit of transformer 40, thereby allowing energy stored in the field of transformer 40 to be transferred back to the primary winding 41. When the polarity of the voltage across winding 41 reverses, diode 54 clamps this voltage to a very low value to prevent a high voltage on collector 46 of transistor 44. Thus, diode 54 dissipates the energy stored in the primary of transformer 40 during the time that transistor 44 was conducting. The efficiency of the circuit in FIG. 2 is greater than the circuit in FIG. 1 because the base drive current is automatically varied in accordance with the collector current; however, the energy stored in the generation of this base current is not ultimately transferred to the load, but, instead is dissipated in diode 54.

Figure 3:
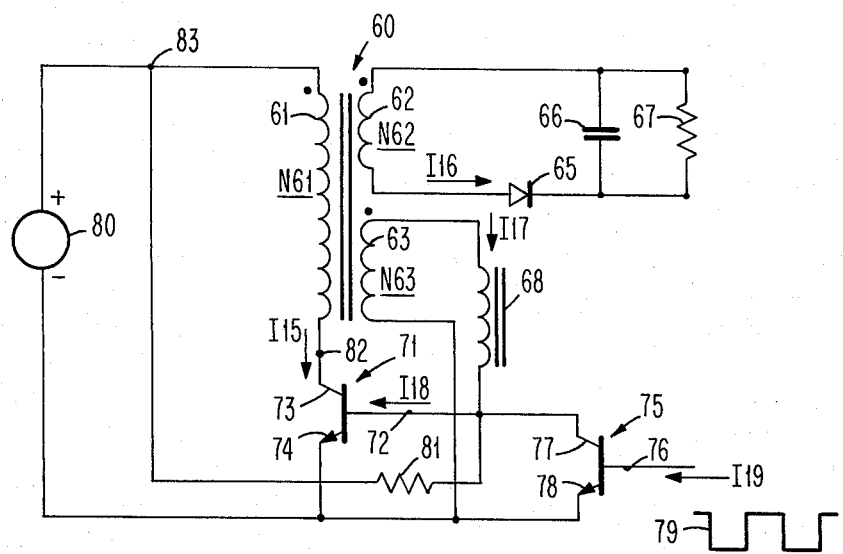
FIG. 3 is a schematic diagram of the DC converter of this invention including the inductive base drive circuitry for providing a controlled base current to the switching transistor.

Referring now to FIG. 3, the preferred embodiment of a highly efficient DC converter circuit is shown including a base drive circuit that dissipates substantially no power during the time that the switching transistor is conducting and transfers substantially all of the energy stored during the production of this base drive current into the load during the time that the switching transistor is not conducting. In FIG. 3 a positive terminal of voltage source 80 is connected to a terminal of primary winding 61 of transformer 60 at node 83. The negative, or reference, terminal of source 80 is connected to the emitter 74 of switching transistor 71 and to the emitter 78 of control transistor 75. The other end of primary winding 61 is connected to the collector 73 of transistor 71 at node 82. A high resistance 81 is connected between node 83 and the base 72 of transistor 71. When current I19, applied to base 76 of control transistor 75, is substantially low, depicted by a down level of waveform 79, the small current flowing into base 72 of switching transistor 71 causes transistor 71 to conduct. The conduction of transistor 71 causes current I15 to begin flowing in transformer primary 61 as indicated in FIG. 3.

Secondary winding 63 of transformer 60 has one terminal connected for reference to the transistor emitters and the negative terminal of source 80. The other terminal of winding 63 is connected through inductor 68 to base 72 of the switching transistor 71. As current I15 begins flowing, a voltage having the magnitude N63/N61 times the voltage of source 80 is produced across winding 63 which, in turn, causes current I17 to flow into base 72 of transistor 71. Current I18 flowing into the base 72 of transistor 71 includes the constant, very small current flowing through resistor 81 as well as I17. As I15 becomes appreciable, I17 represents the substantial portion of I18.

When current I19, applied to base 76 of control transistor 75, is increased to the up level depicted by waveform 79, transistor 75 presents a low impedance path between the collector 77 and emitter 78 thereof, thereby presenting a low impedance path between base 72 and emitter 74 of switching transistor 71, which causes transistor 71 to assume a non-conducting condition. The non-conduction of transistor 71 causes a reversal in the polarity of the secondary winding 62 of transformer 60 which forward biases diode 65 to allow current I16 to flow to load 67 and filter capacitor 66. The magnitude of the voltage across winding 62 is N62/N61 times the voltage across winding 61 of transformer 60. When conduction of transistor 71 ceases, current I17 begins to decay but continues to flow in the same direction back into winding 63. The energy produced by the additional magnetic field generated by the flow of I17 back into winding 63 is transferred to load 67 through winding 62. Thus, the circuit of FIG. 3 enables the energy that is stored during the generation of the switching transistor base current to be transferred to the load rather than being dissipated. It will be obvious that the DC converter efficiency is greatly enhanced in this manner. Along with this greatly improved efficiency, an additional advantage of the prior art circuit of FIG. 2 is also realized in the circuit of this invention in FIG. 3. This additional advantage is the ability to automatically vary the base drive current in accordance with the collector current so that the transistor is never driven into deep saturation which, in turn, creates delays or other problems in turning the transistor off.

The instantaneous current, I17, flowing through inductor 68 as a function of time while transistor 71 is conducting is:

$$I17 = \left[ V61 \left( \frac{N63}{N61} \right) - VBE71 \right] \frac{1}{L68}(t) \quad (1)$$

where:
V61 = Voltage across winding 61 of transformer 60 measured from node 82 to node 83;
N61 = Number of turns of winding 61;
N63 = Number of turns of winding 63;
VBE71 = Base to emitter voltage of transistor 71;
L68 = Inductance of inductor 68; and
t = Time elapsed since transistor 71 was turned on.

By adjusting the turns ratio N63/N61 of transformer 60, the voltage V61 N63/N61 may be made much larger than VBE71 and I17 may be closely approximated by the following equation:

$$I17 \approx V61 \left( \frac{N63}{N61} \right) \frac{1}{L68}(t) \quad (2)$$

Assuming that the component of base current flowing through resistor 81 is negligible compared to the component of base current I17 flowing through inductor 68, the instantaneous current, I18, flowing into the base of transistor 71 is equal to I17 and is, therefore, expressed as:

$$I18 = V61 \left( \frac{N63}{N61} \right) \frac{1}{L68}(t) \quad (3)$$

The current flowing in the transformer primary winding 61 and, therefore, the switching transistor collector 73 is made up of a component contributed by the base current and a component due to the energy stored in the transformer field. The transformer primary current I61 as a function of time after transistor 71 starts conducting and, therefore, the collector current I15 is:

$$I61 = V61 \left[\frac{1}{L61} + \left(\frac{N63}{N61}\right)^2 \frac{1}{L68}\right](t) = I15 \quad (4)$$

where:
L61 is the inductance of primary winding 61 of transformer 60.

For optimum performance of the converter circuit, it is desirable that the base current I18 of transistor 71 vary in accordance with the collector current I15 as follows:

$$I18 = \frac{1}{h_{FE}} I15 \quad (5)$$

where:
$h_{FE}$ is the transistor current gain.

Combining equations 3, 4, and 5 and solving for L68, it is found that:

$$L68 = L61 \frac{N63}{N61} \left[h_{FE} - \frac{N63}{N61}\right] \quad (6)$$

By chosing the inductance of the base drive inductor 68 according to the terms of equation 6, an inductance for inductor 68 will be determined which will match the base and collector currents to the characteristics of the switching transistor. Since the transistor will never have excessive base current, it can be switched off with minimum delay at any point on the collector current waveform.

Figure 4:
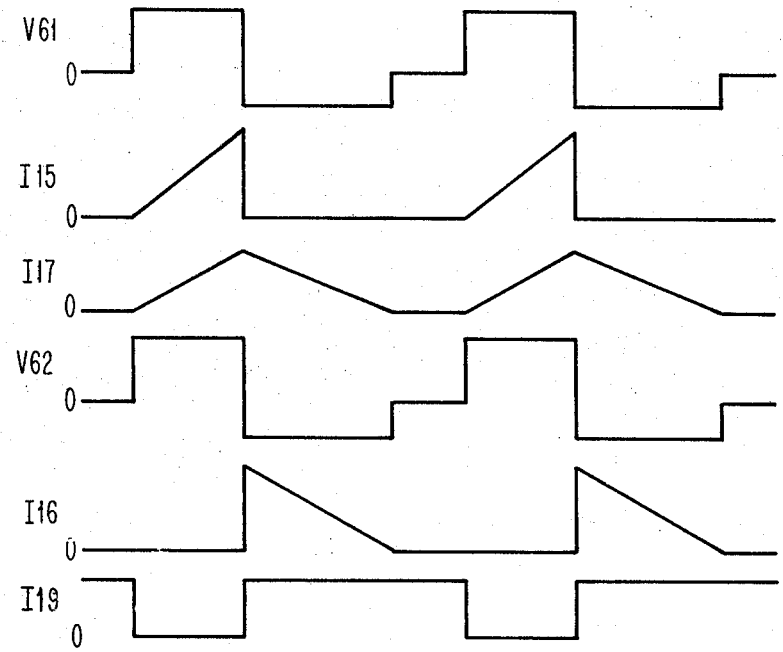
FIG. 4 is a timing diagram showing the relationship of various voltages and currents with respect to time in the circuit of the preferred embodiment of this invention.

Referring now to FIG. 4, when I19 goes to zero, control transistor 75 is turned off and switching transistor 71 is allowed to turn on which results in a step voltage V61 across the primary winding 61 of transformer 60 and a ramp current I15 flowing through winding 61 and into collector 73 of transistor 71. Simultaneously, a step voltage V62 appears across secondary winding 62 of transformer 60; however, diode 65 is back-biased because of the polarity of V62 so that current I16 remains 0. It will be observed that as the collector current I15 increases, the current I17 increases in accordance with the gain of switching transistor 71. When current I19 goes positive, thereby turning on control transistor 75 and turning off switching transistor 71, the inductor current I17 begins to decay. Secondary winding 63 now acts as a primary winding as current I17 decays which, in turn, drives V61 across winding 61 and V62 across winding 62 negative. Diode 65 is forward-biased at this time so that current I16 flows through diode 65 to load 67 and filter capacitor 66.

Thus, a DC voltage converter is provided including an inductive base drive circuit connected to the base of a switching transistor that is utilized to alternately connect and disconnect a primary winding of a transformer and the DC voltage supply. As current in the transformer primary increases, requiring increasing base current to sustain transistor conduction, the base current, provided by a secondary winding of the transformer and an inductor, increases accordingly. The number of turns in this secondary winding and the inductor size are chosen in accordance with the gain of the switching transistor so that the base current applied to the transistor is sufficient to render the transistor conductive at any collector current but varies in proportion to the collector current so that the transistor is not oversaturated at any collector current. When the switching transistor is turned off, energy stored in the transformer and in the inductor is transferred through the transformer to another secondary winding of the transformer connected to the load. This allows the energy stored in the base drive circuit during transistor conduction to be transferred to the load lather than being dissipated. High converter efficiency is attained by the fact that the inductive base drive circuit dissipates substantially no energy during either conduction or non-conduction of the switching transistor.

While the invention has been particularly shown and described with reference to a preferred embodiment thereof, it will be understood by those skilled in the art that various changes in form and detail may be made therein without departing from the spirit and scope of the invention.

What is claimed is:

1. A circuit for converting a first DC voltage to a second voltage, comprising:
   a transformer having a first winding, a second winding, and a third winding;
   switching means connecting said first winding to said first DC voltage for generating said second voltage in said second winding and a third voltage in said third winding, said switching means having a control element responsive to a first current to maintain said switching means in conduction;
   said third winding having a first terminal connected to a reference potential of said first DC voltage;
   an inductive means connected between a second terminal of said third winding and said control element of said switching means for maintaining conduction of said switching means by supplying said first current to said control element; and
   means for connecting said control elements of said switching means to said reference potential for opening said switching means, whereby energy stored in said inductive means and in said transformer is transferred to said second winding.

2. The circuit of claim 1 further comprising means connecting said first DC voltage to said control element for initiating conduction of said switching means by supplying a second current to said control element of said switching means, the magnitude of said second current being substantially smaller than the peak magnitude of said first current.

3. The circuit of claim 2 wherein said switching means further comprises a transistor and said control element of said switching means includes a base of said transistor.

4. The circuit of claim 3 wherein said inductive means further comprises an inductor having an inductance $$L_B = L_P \frac{N3}{N1} \left[h_{FE} - \frac{N3}{N1}\right]$$

where:
$L_P$ is the inductance of said first winding of said transformer;
N3 is the number of turns in said third winding of said transformer;
N1 is the number of turns in said first winding of said transformer; and $h_{FE}$ is the current gain of said transistor of said switching means.

5. The circuit of claim 4 wherein said means connecting said control element of said switching means to said reference potential is responsive to a first level of an alternating current for connecting said base of said transistor to said reference potential and responsive to a second level of said alternating current for disconnecting said base of said transistor from said reference potential.

6. The circuit of claim 5 wherein said alternating current further comprises a rectangular waveform.

7. The circuit of claim 6 wherein said means connecting said first DC voltage to said control element further comprises a resistor.

8. The circuit of claim 7 further comprising rectifying and filtering means connected to said second winding for further converting said second voltage to a second DC voltage.

* * * * *